United States Patent [19]

Hartman et al.

[11] 4,409,375

[45] Oct. 11, 1983

[54] METHOD FOR SCAVENGING ALDEHYDES

[75] Inventors: Seymour Hartman, Mahopac; Timothy M. Brown, Holmes, both of N.Y.

[73] Assignee: Champion International Corporation, Stamford, Conn.

[21] Appl. No.: 347,965

[22] Filed: Feb. 11, 1982

[51] Int. Cl.³ .............................................. C08G 12/40
[52] U.S. Cl. .................................... 525/505; 528/254; 528/487; 528/488
[58] Field of Search ................ 525/505; 528/487, 488, 528/254

[56] References Cited

U.S. PATENT DOCUMENTS

| | | | |
|---|---|---|---|
| 4,202,959 | 5/1980 | Henbest et al. ................ | 525/505 X |
| 4,264,760 | 4/1981 | Meyer ............................ | 525/505 X |
| 4,336,170 | 6/1982 | Horiike et al. ................. | 528/487 X |

*Primary Examiner*—Lucille M. Phynes
*Attorney, Agent, or Firm*—Evelyn M. Sommer

[57] ABSTRACT

A method is described for reducing the amount of aldehyde liberated from aldehyde-containing resins during the production and subsequent use of products prepared with the resin by admixing bisulfite salt scavengers therewith. A method is also described for reducing airborne aldehydes from the environment by placing aqueous solutions of bisulfite salts in the aldehyde-containing environment.

9 Claims, No Drawings

METHOD FOR SCAVENGING ALDEHYDES

BACKGROUND OF THE INVENTION

This application relates to a method for scavenging aldehydes such as formaldehyde, irrespective of the source from which the aldehyde is derived, utilizing bisulfite salts.

Aldehydes, especially formaldehyde, are widely used in resin compositions. Certain of these resin compositions are extensively used in the manufacture of construction materials such as decking, paneling, shelving, cabinets, etc.; in home furnishings such as furniture, carpeting, drapery and upholstery fabrics and in foam insulation. Typically, these resin compositions contain a substantial molar excess of formaldehyde. Some of this excess formaldehyde is released upon curing of the resin during the manufacture of the product e.g., particle board. However, the problem is that formaldehyde continues to be released from these products after the manufacturing process is completed. There are several sources of this released formaldehyde, e.g. unreacted excess formaldehyde, hydrolysis and products formed from the reaction of formaldehyde and urea, as well as decomposition of the resin from age, humidity, temperature, weathering, etc. Formaldehyde is very volatile, has a very unpleasant odor which irritates the eyes and nasal passages and may give rise to other health problems. Although to date, no evidence links formaldehyde as being a toxic, carcinogenic or mutagenic substance, it is very important for both health and aesthetic reasons not only to limit the concentration of aldehydes in the environment during the production of the products utilizing aldehyde based resins but also to minimize the amounts of aldehyde released from these products over the useful life of these products. Several methods have been explored for reducing aldehyde release from the above-mentioned products, by the incorporation of additives into the adhesive resins, but it has not been possible to eliminate the aldehyde liberation therefrom over an extended period of time. Other methods have been explored for reducing the concentration of airborne aldehyde especially formaldehyde emitted from these products, or any other sources by the use of coatings, plastic films (polyethylene) placed over the board products, as well as the use of mechanical devices containing odor absorbers, air refreshers, etc. These methods have only reduced the rate of the aldehyde liberation, but not the amount liberated.

Furthermore, the rate at which the aldehyde is liberated depends upon the temperature, the relative humidity of the environment, the loading factor, i.e. the type of products, the surface area of the products and the resin formulations used to prepare the products, etc.

Therefore, there is a need for effective methods not only to reduce the amount of aldehyde released during the manufacture and subsequent use of the resin containing products but also for a method to remove airborne aldehydes from the environment irrespective of their source.

A discussion of the problems and earlier methods for reducing the odor emitted from formaldehyde based resins and the products derived therefrom is presented in U.S. Pat. No. 4,264,760. That patent describes a method for deodorizing formaldehyde based resins by adding to the resin, sulfur-containing compounds primarily the oxyacid salts of sulfur in which the sulfur valence ranges from $+5$ to $-2$ inclusive. The sulfur concentration ranges from 0.3 to 30% by weight of the total resin. The formaldehyde to sulfur molar ratio can be between 1 to 10 and 10 to 7 but it is preferable to keep the range within molar matching of the reagents. To be effective, in reducing the amount of formaldehyde release, the resin plus the sulfur compound additive mixture must be cured either by exposure to low pH or to heat. The patent cites several examples of various formaldehyde based resins in which the amount of formaldehyde released is reduced after 24 hours by 15-40% on treatment with the sulfur based additives. Specifically a 2-4% by weight 1:1 molar mixture of sodium sulfite:-sodium bisulfite additive reduces the amount of formaldehyde released after three weeks from urea-formaldehyde insulation foam by 27-31%. While sodium bisulfite is suggested within the broad classification of oxyacid salts of sulfur, no where is the use of sodium bisulfite alone disclosed to be an effective scavenger of formaldehyde.

Accordingly, an object of the present invention is to provide a method for reducing the amount of aldehydes liberated during the production of and subsequent use of aldehyde releasing products.

A further object is to provide a method for scavenging from the environment aldehydes irrespective of their source.

STATEMENT OF THE INVENTION

A method for scavenging aldehydes utilizing alkali metal bisulfite salts is described. The addition of bisulfite salts to aldehyde based resins reduces the amount of aldehyde liberated during the manufacture and subsequent use of the product containing the resin. In addition, aqueous solutions of alkali metal bisulfite salts are effective scavengers of airborne aldehydes.

The method for reducing the amount of aldehydes liberated by materials and products prepared with aldehyde based resins is applicable to all aldehyde based resins, e.g., it is applicable to urea-formaldehyde, melamine-formaldehyde, phenol-formaldehyde resins and the like as well as copolymers, blends and mixtures made therefrom. In accordance with the present invention, an alkali metal bisulfite salt scavenger, in an effective concentration range of less than 10% by weight of the resin and preferably, from about 1-3% alkali metal bisulfite by weight of the resin is admixed with the resin. For example, the addition of 1% sodium bisulfite to a urea-formaldehyde glue mixture reduces the amount of formaldehyde liberated from particleboard prepared with this mixture by 38%; whereas, a 10% sodium bisulfite addition to the glue mixture reduces the amount of formaldehyde liberation from particleboard prepared with this mixture to only 5%. This fact may be attributed to the pH of the respective solutions. The stability of the bisulfite/formaldehyde reaction product formed is dependent upon the pH of the respective solutions. Typically, any alkali metal bisulfite such as the lithium, sodium, potassium and ammonium bisulfites can be employed.

To determine the effectiveness of a particular scavenger in a glue mix formulation, it is necessary to compare the aldehyde released from samples prepared using the particular resin-scavenger formulation with a control sample i.e., a sample identically prepared with the resin but containing no scavenger. The equilibrium jar method can be employed to collect the formaldehyde liberated from the particleboard. The formaldehyde concentration (ppm) is determined by use of the chromotropic acid spectrophotometric method.

For example, samples of ¾" particleboard are prepared with urea-formaldehyde glue mixtures with and without a specific concentration of scavenger additive. The prepared particleboard samples are cut into the proper size, e.g. 2.75"×5" and placed in a quart jar. Another quart jar is inverted and placed on top of the first jar containing the particleboard sample, a so-called mouth-to-mouth position. The mouth-to-mouth jars are sealed with PARAFILM which can be obtained from American Can Company, Neenah, Wis. The sealed mouth-to-mouth jars are placed in a constant humidity room (50% R.H.) which is maintained at a regulated temperature for 24 hours. After 24 hours, the sealed jars are removed from the test room. The PARAFILM is removed from the sealed jars, and the upper jar which contains the formaldehyde vapors is inverted and screwed into a jar cap contained in a formaldehyde collecting train. Vacuum is applied to the collecting train and controlled with a flow meter to yield a flow rate of 1000 ml or 1 liter of air per minute for 1 hour. The formaldehyde vapors pulled from the test jar are entrapped in two impingers in series with each other. An aliquot sample from the impingers is removed and analyzed for its formaldehyde content using the chromotropic acid spectrophotometric method, as described in the NIOSH procedure contained in DHEW Publication #77-126 - "Criteria for a Recommended Standard Occupational Exposure to Formaldehyde" or in the NIOSH Manual of Analytical Methods - HEW Publication #75-12V-1974 for determining airborne formaldehyde.

In another embodiment, aldehydes are scavenged from the environment by use of aqueous solutions of bisulfite salts. Solutions with effective concentrations of bisulfite salts of 10% or less are suitably employed. Preferably, solutions having bisulfite salt concentrations of 0.5 to 7% and more preferably, concentrations of 1-3% of bisulfite salt are employed. Concentrations greater than 10% are ineffective in reducing the level of formaldehyde in the environment probably due to a lowering of the pH of the system at higher bisulfite concentrations.

The following example illustrates the effectiveness of aqueous solutions of alkali metal bisulfites as scavengers of formaldehyde.

A test room which is 13'×16'×16' (3328 cu. ft.) with an effective loading rate of particleboard set at 0.125 sq. ft./cu. ft. one face, maintained at a temperature of 75° F. and in which the background level of formaldehyde over a 30 day period has been determined to be 0.29 ppm was used. Six pans (total surface area 858 sq. inches) into which 2 gallons (7600 ml) of a 1% aqueous solution of sodium bisulfite had been equally divided were placed in this test room. Multiple pans were used to increase the surface area of scavengers to which the airborne formaldehyde is exposed. The airborne formaldehyde in the test room was measured every 24 hours using the NIOSH sampling procedure and the chromotropic acid test procedure cited above. The reduction in formaldehyde was dramatic ranging from 75% to 85%. The effectiveness of the scavenger solution, if not changed daily, decreased with time to a minimum value of 46% after the 4th day. Water alone was ineffective in reducing airborne formaldehyde concentrations.

What is claimed is:

1. A method for scavenging aldehydes which comprises exposing the aldehydes to alkali metal bisulfite salts as the only scavenging agents.

2. A method as described in claim 1 in which the bisulfite salt is admixed with a pre-formed aldehyde based resin prior to use of the resin.

3. A method as described in claim 2 in which the bisulfite salt is sodium bisulfite.

4. A method as described in claim 3 in which the concentration of the bisulfite salt is an effective amount less than 10% based on the weight of resin.

5. A method as described in claim 4 in which the preformed aldehyde based resin is a urea-formaldehyde resin.

6. A method as described in claim 1 in which the bisulfite salts are in an aqueous solution.

7. A method as described in claim 6 in which the concentration of the bisulfite salt in the aqueous solution is an effective amount less than 10% based on the weight of solution.

8. A method as described in claim 7 in which the bisulfite salt is sodium bisulfite.

9. A method as described in claim 8 in which the aldehyde is formaldehyde.

* * * * *